(12) United States Patent
Wang

(10) Patent No.: US 10,139,950 B2
(45) Date of Patent: Nov. 27, 2018

(54) FLEXIBLE DISPLAY DEVICE AND DRIVING METHOD THEREOF

(71) Applicant: BOE Technology Group Co., Ltd., Beijing (CN)

(72) Inventor: Ming Hsi Wang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 36 days.

(21) Appl. No.: 15/315,021

(22) PCT Filed: Mar. 22, 2016

(86) PCT No.: PCT/CN2016/076977
§ 371 (c)(1),
(2) Date: Nov. 30, 2016

(87) PCT Pub. No.: WO2016/165535
PCT Pub. Date: Oct. 20, 2016

(65) Prior Publication Data
US 2017/0097721 A1    Apr. 6, 2017

(30) Foreign Application Priority Data

Apr. 15, 2015  (CN) .......................... 2015 1 0179074

(51) Int. Cl.
*G06F 3/045*  (2006.01)
*G06F 3/041*  (2006.01)
(Continued)

(52) U.S. Cl.
CPC .......... *G06F 3/0416* (2013.01); *G06F 1/1652* (2013.01); *G06F 1/1677* (2013.01);
(Continued)

(58) Field of Classification Search
CPC ....... G06F 1/1652; G06F 3/017; G06F 1/1626
See application file for complete search history.

(56) References Cited

U.S. PATENT DOCUMENTS

| 2013/0063391 | A1 | 3/2013 | Kang et al. |
| 2013/0300677 | A1* | 11/2013 | Kim ...................... G06F 3/0414 |
| | | | 345/173 |
| 2014/0029017 | A1* | 1/2014 | Lee ........................ G01B 11/24 |
| | | | 356/601 |

FOREIGN PATENT DOCUMENTS

| CN | 202486763 U | 10/2012 |
| CN | 202535639 U | 11/2012 |

(Continued)

OTHER PUBLICATIONS

Jul. 27, 2004—(CN) First Office Action Appn 201510179074.0 with English Tran.

(Continued)

*Primary Examiner* — Nan-Ying Yang
(74) *Attorney, Agent, or Firm* — Banner & Witcoff, Ltd.

(57) ABSTRACT

A flexible display device and driving method thereof are disclosed. The flexible display device includes: a first substrate and at least one bending status sensing module, the bending status sensing module includes: a driving unit for generating and outputting a driving signal; a sensing section connected with the driving unit and disposed on the first substrate, which is bent as the flexible display device is bent to sense the bending status of the flexible display device under the driving of the driving signal and generate a sensing signal; an analyzing unit connected with the sensing section and configured for obtaining the bending status information of the flexible display device according to the sensing signal to enable the flexible display device to perform an operation corresponding to the obtained bending status information.

19 Claims, 7 Drawing Sheets

(51) Int. Cl.
*G06F 3/044* (2006.01)
*G06F 1/16* (2006.01)

(52) U.S. Cl.
CPC .... *G06F 3/044* (2013.01); *G06F 2203/04102* (2013.01); *G06F 2203/04111* (2013.01)

(56) References Cited

FOREIGN PATENT DOCUMENTS

| | | | |
|---|---|---|---|
| CN | 102968234 | A | 3/2013 |
| CN | 103218096 | A | 7/2013 |
| CN | 103294287 | A | 9/2013 |
| CN | 103389822 | A | 11/2013 |
| CN | 103576979 | A | 2/2014 |
| CN | 104199579 | A | 12/2014 |
| CN | 104571747 | A | 4/2015 |
| CN | 104721436 | A | 6/2015 |

OTHER PUBLICATIONS

Jun. 27, 2016—(WO) International Search Report and Written Opinion Appn application PCT/CN2016/076977 with English Tran.
May 4, 2017—(CN) First Office Action Appn 201510179074.0 with English Tran.

* cited by examiner

FLEXIBLE DISPLAY DEVICE AND DRIVING METHOD THEREOF

The application is a U.S. National Phase Entry of International Application No. PCT/CN2016/076977 filed on Mar. 22, 2016, designating the United States of America and claiming priority to Chinese Patent Application No. 201510179074.0 filed on Apr. 15, 2015. The present application claims priority to and the benefit of the above-identified applications and the above-identified applications are incorporated by reference herein in their entirety.

TECHNICAL FIELD

Embodiments of the present disclosure relate to a flexible display device and a driving method thereof.

BACKGROUND

Gesture-based human-machine interaction technology breaks the limitations of traditional interaction equipments such as a keyboard and a mouse, allowing a user to communicate with an equipment by means of gestures during human-machine interaction and realizing new experience of human-machine interface.

Flexible displays have remarkable advantages over conventional displays such as bendability, good flexibility, high endurance, thin profile, low power consumption, long battery life, and are display devices receiving broad attention in the industry at present.

SUMMARY

Embodiments of the present disclosure provide a flexible display device and a driving method thereof.

Embodiments of the present disclosure adopt the following technical proposal.

An embodiment of the present disclosure provides a flexible display device, comprising: a first substrate and at least one bending status sensing module that is configured to sense bending status information of the flexible display device; the bending status sensing module comprises: a driving unit configured to generate and output a driving signal; a sensing section connected with the driving unit and disposed on the first substrate, the sensing section being configured to be bent as the flexible display device is bent and sense a bending status of the flexible display device under driving of the driving signal and generate a sensing signal; and an analyzing unit connected with the sensing section and configured to obtain the bending status information of the flexible display device according to the sensing signal to enable the flexible display device to perform an operation corresponding to the obtained bending status information.

For example, the flexible display device further comprises a touch function module, wherein the touch function module comprises a plurality of electrode lines disposed on the first substrate, the plurality of electrode lines comprise X electrode lines in an X direction and Y electrode lines in a Y direction, the X direction and the Y direction are perpendicular to each other, and the touch function module is configured to sense a touch position of a user touching the flexible display device; and the sensing section of the bending status sensing module at least shares a portion of one of the electrode lines in a time division manner, the touch function module senses and obtains the touch position in a touch period included in a driving period, and the bending status sensing module senses and obtains the bending status information in a bending status sensing period included in the driving period.

For example, the electrode lines included in the touch function module comprise a plurality of transparent electrodes connected in series; the sensing section comprises a first sensing section that shares a portion of one electrode line in a time division manner, the first sensing section extends in a direction identical to a direction in which a bending status to be sensed is located, the transparent electrodes included in the portion of the electrode line shared by the first sensing section are first bending status sensing electrodes, the transparent electrodes not included in the portion of the electrode line to which the first sensing section belongs are touch electrodes, a size of the first bending status sensing electrodes increases upon the flexible display device being bent positively and decreases upon the flexible display device being bent negatively, wherein positive bending is bending away from a side of the first substrate on which the sensing section is located, and negative bending is bending towards the side of the first substrate on which the sensing section is located.

For example, the analyzing unit comprises: a sensing signal analyzing sub-unit configured to analyze the sensing signal to derive a current resistance value of the first sensing section; a bending manner determining sub-unit connected with the sensing signal analyzing sub-unit and configured to compare the current resistance value with a reference resistance value, the reference resistance value being a resistance value of the first sensing section upon the flexible display device being not bent, determine that the flexible display device is currently in a positive bending status in an extension direction of the first sensing section if the current resistance value is larger than the reference value, determine that the flexible display device is currently in a non-bending status in the extension direction of the first sensing section if the current resistance value equals the reference resistance value, and determine that the flexible display device is currently in a negative bending status in the extension direction of the first sensing section if the current resistance value is smaller than the reference resistance value; and a bending degree calculating sub-unit connected with the sensing signal analyzing sub-unit and configured to calculate a difference value between the current resistance value and the reference resistance value, wherein based on the difference value a bending degree of the flexible display device in the extension direction of the first sensing section is obtained.

For example, the electrode line further comprises: connection sections configured to each connect two adjacent transparent electrodes; and the connection sections included in the electrode line to which the first sensing section belongs comprise touch connection sections and a bending status sensing connection section, the touch connection section is configured to connect two adjacent touch electrodes and connect touch electrodes and the first bending status sensing electrodes that are adjacent, the bending status sensing connection section is configured to connect two adjacent first bending status sensing connection electrodes, and a cross-sectional area of the touch connection sections perpendicular to the extension direction of the first sensing section is smaller than a cross-sectional area of the bending status sensing connection section perpendicular to the extension direction of the first sensing section.

For example, a width of the touch connection sections is smaller than a width of the bending status sensing connection section; or the bending status sensing connection section comprises at least two bending status sensing connection sub-sections each connecting two adjacent first bending status sensing electrodes and having a width smaller than or equal to that of the touch connection sections.

For example, the first sensing section shares 3 to 10 of the first bending status sensing electrodes in a time division manner.

For example, a midpoint of the first sensing section coincides with a midpoint of the electrode line to which the first sensing section belongs.

For example, the electrode line to which the first sensing section belongs is an outermost electrode line in the touch function module.

For example, the sensing section further comprises a second sensing section, the second sensing section shares a plurality of electrode lines in a time division manner, the plurality of electrode lines shared by the second sensing section are perpendicular to an extension direction of the first sensing section, and the first bending status sensing electrodes shared by the first sensing section and the electrode lines shared by the second sensing section are arranged alternatively in the extension direction of the first sensing section, transparent electrodes included in the electrode lines shared by the second sensing section are second bending status sensing electrodes, the second bending status sensing electrodes and first bending status sensing electrodes located on both sides thereof generate capacitance accordingly, and a gap between the first bending status sensing electrode and the second bending status sensing electrode increases upon the flexible display device being bent positively and decreases upon the flexible display device being bent negatively.

For example, the analyzing unit comprises: a sensing signal analyzing sub-unit configured to analyze the sensing signal to derive a current capacitance value between the first sensing section and the second sensing section; a bending manner determining sub-unit connected with the sensing signal analyzing sub-unit and configured to compare the current capacitance value with a reference capacitance value, the reference capacitance value being a capacitance value between the first sensing section and the second sensing section upon the flexible display device being not bent, determine that the flexible display device is currently in a positive bending status in the extension direction of the first sensing section if the current capacitance value is smaller than the reference capacitance value, determine that the flexible display device is currently in a non-bending status in the extension direction of the first sensing section if the current capacitance value equals the reference capacitance value, and determine that the flexible display device is currently in a negative bending status in the extension direction of the first sensing section if the current capacitance value is larger than the reference capacitance value; and a bending degree calculating sub-unit connected with the sensing signal analyzing sub-unit and configured to calculate a difference value between the current capacitance value and the reference capacitance value, wherein based on the difference value a bending degree of the flexible display device in the extension direction of the first sensing section is obtained.

For example, the analyzing unit comprises: a sensing signal analyzing sub-unit configured to analyze the sensing signal to derive a current resistance value of the first sensing section and a current capacitance value between the first sensing section and the second sensing section; a bending manner determining sub-unit connected with the sensing signal analyzing sub-unit and configured to compare the current resistance value with a reference resistance value, the reference resistance value being a resistance value of the first sensing section upon the flexible display device being not bent, determine that the flexible display device is currently in a positive bending status in the extension direction of the first sensing section if the current resistance value is larger than the reference value, determine that the flexible display device is currently in a non-bending status in the extension direction of the first sensing section if the current resistance value equals the reference resistance value, and determine that the flexible display device is currently in a negative bending status in the extension direction of the first sensing section if the current resistance value is smaller than the reference resistance value; and a bending degree calculating sub-unit connected with the sensing signal analyzing sub-unit and configured to calculate a difference value between the current capacitance value and a reference capacitance value, wherein based on difference value a bending degree of the flexible display device in the extension direction of the first sensing section is obtained, the reference capacitance value is a capacitance value between the first sensing section and the second sensing section upon the flexible display device being not bent.

For example, the flexible display device comprises at least one bending status sensing module which is configured to sense a bending status of the flexible display device in the X direction and is an X bending status sensing module, and a bending status sensing module which is configured to sense a bending status of the flexible display device in the Y direction and is a Y bending status sensing module, an electrode line to which a first sensing section of the X bending status sensing module belongs is an X electrode line, and an electrode line to which a first sensing section of the Y bending status sensing module belongs is a Y electrode line.

For example, the flexible display further comprises: a second substrate disposed oppositely to the first substrate, wherein a plurality of electrode lines of the touch function module are located on a side of the first substrate that faces towards or away from the second substrate.

For example, the bending status sensing module further comprises: an input signal line configured to connect the driving unit and the sensing section; and an output signal line configured to connect the analyzing unit and the sensing section.

An embodiment of the present disclosure provides a driving method for a flexible display device for driving any one of the above-mentioned flexible display devices, the driving method comprises: generating and outputting a driving signal; sensing a bending status of the flexible display device under driving of the driving signal and generating a sensing signal; and obtaining bending status information of the flexible display device according to the sensing signal to enable the flexible display device to perform an operation corresponding to the obtained bending status information.

For example, the flexible display device further comprises a touch function module comprising a plurality of electrode lines and the sensing section of the flexible display device shares at least a portion of one of the electrode lines in a time division manner, one driving period comprises a touch period and a bending status sensing period, and the driving method comprises: sensing a touch position of a user touching the flexible display device in the touch period, and sensing to obtain the bending status information in the bending status sensing period.

For example, the sensing section comprises a first sensing section, and obtaining bending status information of the flexible display device according to the sensing signal comprises: analyzing the sensing signal to derive a current resistance value of the first sensing section; comparing the current resistance value with a reference resistance value of the first sensing section, the reference resistance value being a resistance value of the first sensing section upon the flexible display device being not bent, determine that the flexible display device is currently in a positive bending status in an extension direction of the first sensing section if the current resistance value of the first sensing section is larger than the reference value, determine that the flexible display device is currently in a non-bending status in the extension direction of the first sensing section if the current resistance value of the first sensing section equals the reference resistance value, and determine that the flexible display device is currently in a negative bending status in the extension direction of the first sensing section if the current resistance value of the first sensing section is smaller than the reference resistance value; and calculating a difference value between the current resistance value of the first sensing section and the reference resistance value, wherein based on the difference value a bending degree of the flexible display device in the extension direction of the first sensing section is obtained.

For example, the sensing section comprises a first sensing section and a second sensing section, the second sensing section generates capacitance with the first sensing section correspondingly, and obtaining bending status information of the flexible display device according to the sensing signal comprises: analyzing the sensing signal to derive a current capacitance value between the first sensing section and the second sensing section; comparing the current capacitance value with a reference capacitance value, the reference capacitance value being a capacitance value between the first sensing section and the second sensing section upon the flexible display device being not bent, determining that the flexible display device is currently in a positive bending status in an extension direction of the first sensing section if the current capacitance value is smaller than the reference capacitance value, determining that the flexible display device is currently in a non-bending status in the extension direction of the first sensing section if the current capacitance value equals the reference capacitance value, and determining that the flexible display device is currently in a negative bending status in the extension direction of the first sensing section if the current capacitance value is larger than the reference capacitance value; and calculating a difference value between the current capacitance value and the reference capacitance value, wherein based on the difference value a bending degree of the flexible display device in the extension direction of the first sensing section is obtained.

For example, the sensing section comprises a first sensing section and a second sensing section, the second sensing section generates capacitance with the first sensing section correspondingly, and obtaining bending status information of the flexible display device according to the sensing signal comprises: analyzing the sensing signal to derive a current resistance value of the first sensing section and a current capacitance value between the first sensing section and the second sensing section; comparing the current resistance value with a reference resistance value, the reference resistance value being a resistance value of the first sensing section upon the flexible display device being not bent, determining that the flexible display device is currently in a positive bending status in an extension direction of the first sensing section if the current resistance value is larger than the reference value, determining that the flexible display device is currently in a non-bending status in the extension direction of the first sensing section if the current resistance value equals the reference resistance value, and determining that the flexible display device is currently in a negative bending status in the extension direction of the first sensing section if the current resistance value is smaller than the reference resistance value; and calculating a difference value between the current capacitance value and a reference capacitance value, wherein based on the difference value a bending degree of the flexible display device in the extension direction of the first sensing section is obtained, and the reference capacitance value is a capacitance value between the first sensing section and the second sensing section when the flexible display device being not bent.

BRIEF DESCRIPTION OF DRAWINGS

Embodiments of the present disclosure will be described in more detail below with reference to accompanying drawings to allow those of ordinary skill in the art to more clearly understand embodiments of the present disclosure, in which.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The inventor has noted that, with the progressive development of the gesture-based human-machine interaction technology and the flexible display technology, it is desired to realize a gesture input function on a flexible display by means of the bendability feature of flexible display, that is, issuing instructions to a flexible display with gestures.

Embodiments of the present disclosure will be explained below with reference to accompanying drawings.

Figure 1A:
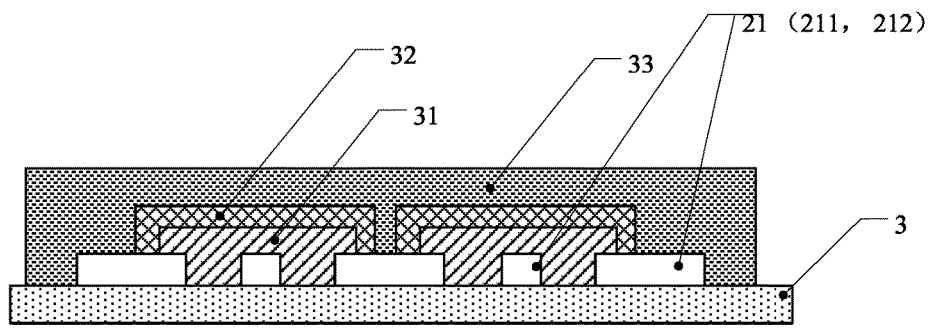
FIG. 1A is a partial structure diagram of a flexible display device provided in an embodiment of the present disclosure.

As shown in FIG. 1A, in one example, the flexible display device of an embodiment of the present disclosure includes a first substrate 3 and electrode lines 21 disposed on the first substrate 3 including electrode lines 211, 212 arranged in an X direction and a Y direction respectively, an insulating layer 31 formed on the electrode lines and a conductive layer 32 formed on the insulating layer 31. Furthermore, it is also possible to form a protection layer 33 on the conductive layer 32 and the electrode lines 21.

Embodiment I

Figure 1B:
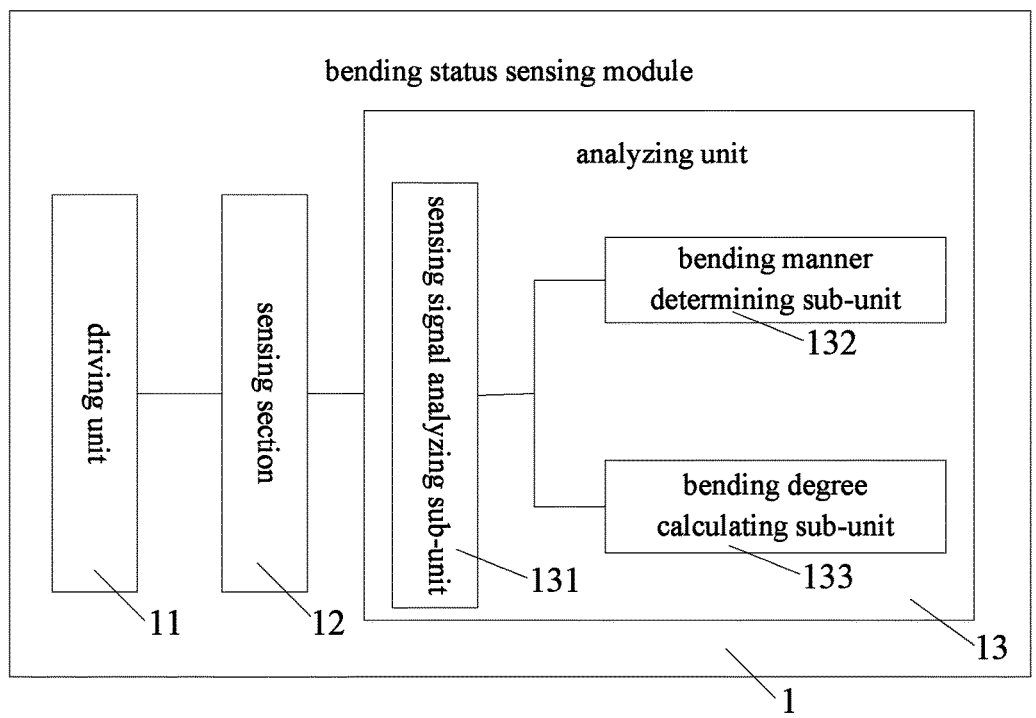
FIG. 1B is a structure diagram of a bending status sensing module in the flexible display device of the embodiment I of the present disclosure.

The present embodiment provides a flexible display device including: a first substrate and at least one bending status sensing module for sensing the bending status information of the flexible display device. As shown in FIG. 1B, the bending status sensing module 1 includes: a driving unit 11 for generating and outputting driving signals; a sensing section 12 connected with the driving unit 11 and disposed on the first substrate 3, the sensing section 12 bending as the flexible display device is bent so as to sense the bending status of the flexible display device under the driving of driving signals and generate a sensing signal; an analyzing unit 13 connected with the sensing section 12 for obtaining the bending status information of the flexible display device according to the sensing signal to enable the flexible display device to perform an operation corresponding to the obtained bending status information.

In the embodiment, a bending status sensing module 1 is provided in the flexible display device to sense the bending status of the screen thereof, the driving unit 11 of the bending status sensing module 1 generates and outputs driving signals to drive the sensing section 12 of the bending status sensing module 1 during the sensing process; the sensing section 12 is disposed on the first substrate 3 of the flexible display device and can be bent as the flexible display device is bent when a user bends the flexible display device and generates a sense signal under the driving of the driving signals; then the analyzing unit 13 of the bending status sensing module 1 analyzes the generated sense signal to obtain the bending status information of the flexible display device, therefore the flexible display device can carry out corresponding operations according to the bending status information obtained through the analysis. For example, if it is sensed that the user bends the flexible display device in the direction facing away from the displaying side, the flexible display device can zoom in the pictures or windows, and if it is sensed that the user bends the flexible display device in the direction facing towards the displaying side, the flexible display device can zoom out pictures or windows. In this way, the function of inputting gesture of bending the flexible display device into the flexible display device can be realized.

Embodiment II

Touch screens are often used as input devices of displays. The flexible display device provided in the present embodiment may incorporate a touch function and allows the sensing section 12 in the bending status sensing module 1 to share the electrode lines of a touch function module such that the internal structure of the display device can be simplified, the device can become thin and slight, the costs can be reduced, and the reliability of the flexible display device can be improved. The structure for the sensing section 12 to share electrode lines 21 will be described in detail below.

Figure 2:
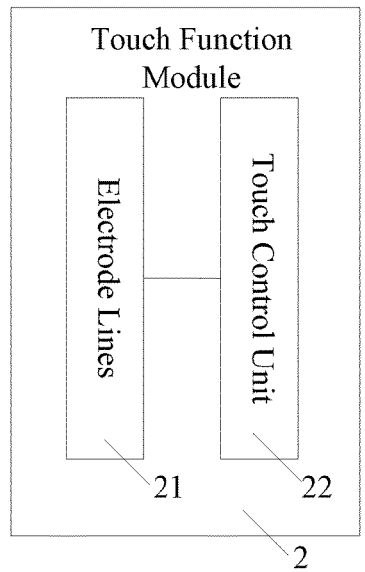
FIG. 2 is a structure diagram of a touch function module in the flexible display device of embodiment II of the present disclosure.

As shown in FIG. 2, the flexible display device provided in the present embodiment may further include: a touch function module 2 including a plurality of electrode lines 21 disposed on the first substrate for sensing a touch position of the user who is touching the flexible display device. The touch function module 2 may further include a touch control unit 22 connected with these electrode lines 21. During the touch driving process, the electrode lines 21 can be used to sense the touch position of the user who is touching the flexible display device to generate a sense signal, ad the touch control unit 22 can be used to analyze the sense signal generated by the electrode lines 21 to obtain the touch position coordinates.

Figure 3:
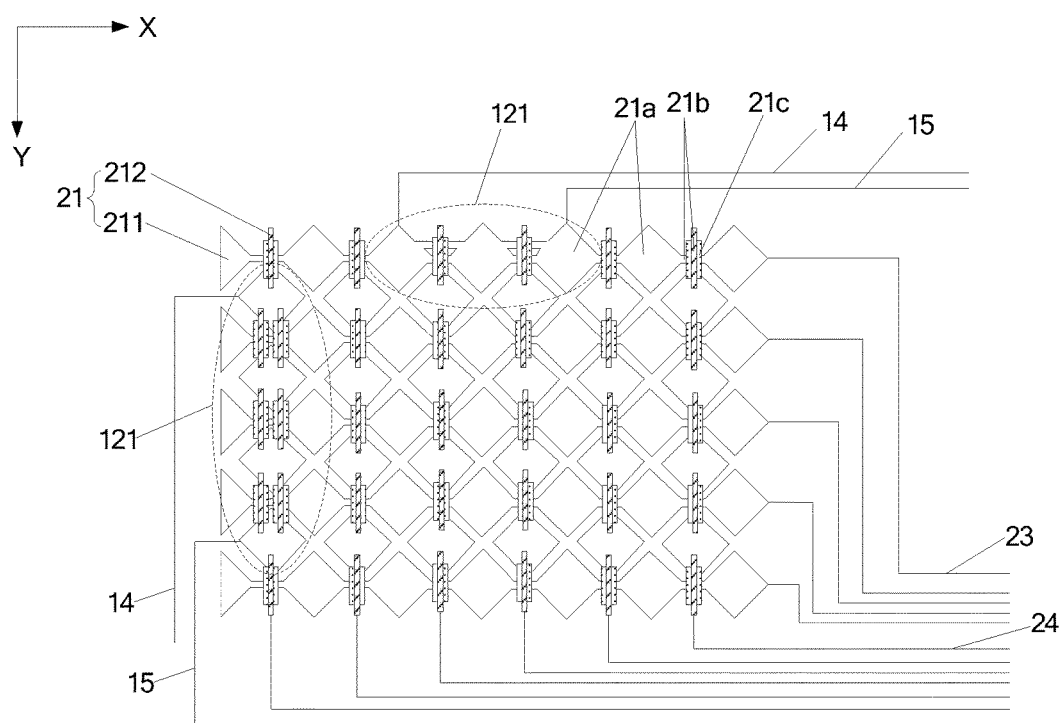
FIG. 3 is a planar structure diagram of shared electrode lines of sensing section in the flexible display device of embodiment II of the present disclosure.

As shown in FIG. 3, the plurality of electrode lines 21 of the touch function module 2 include X electrode lines 211 in the X direction and Y electrode lines 212 in the Y direction with the X and Y directions being perpendicular to each other, and the sensing section 12 of the bending status sensing module 1 may at least share a portion of one electrode line in a time division manner. One driving period includes a touch period in which the touch function module 2 senses the touch position and a bending status sensing period in which the bending status sensing module 1 senses the bending status information, thereby realizing time division sharing of electrode lines 21 by the sensing section 12.

It is noted that, although it is possible to sense the bending status of the screen by disposing sensing devices such as piezoelectric elements on the flexible display (e.g., at the four corners of the flexible display), the sensing devices such as piezoelectric elements need to be incorporated additionally in the whole design in this approach. The sensing devices by themselves have a large thickness and will cause the display to be relatively heavy and thick. Further addition of the sensing devices may also increase the manufacturing costs of display and addition of sensing devices inside the display will inevitably cause undesirable effects upon other elements inside the display, lowering the reliability of the display. In the present embodiment, further addition of sensing section 12 is avoided by allowing the sensing section 12 in the bending status sensing module 1 to share the electrode lines 21 of the touch function module 2, thereby avoiding problems resulted from additionally disposing sensing devices such as piezoelectric elements, for example, becoming thick and heavy, cost increase, and reliability reduction, as well as realizing input of a bending gesture.

In this embodiment, each electrode line 21 of the touch function module 2 may include a plurality of transparent electrodes 21a that are connected in series, and the transparent electrodes may be e.g., diamond-shaped electrodes. In manufacturing, transparent electrodes 21a included in both X electrode lines 211 and Y electrode lines 212 may be formed in a same patterning process first, and then an insulating layer 21b is formed over the connection sections for connecting the transparent electrodes 21a in the X electrode lines 211, and then via holes are formed in the insulating layer 21a at the locations corresponding to the transparent electrodes 21a included in the Y electrode lines 212 to expose the surfaces of the transparent electrodes 21a included in the Y electrode lines 212, and then bridging sections 21c are formed to allow the bridging sections 21c to electrically connect transparent electrodes 21a included in the Y electrode lines 212 through the via holes, and the presence of insulating layer 21b insulates the X electrode lines 211 from the Y electrode lines 212.

It should be noted that in other embodiments of the present disclosure, alternatively it is also possible to connect the transparent electrodes 21a included in the Y electrode lines 212 in manufacturing the transparent electrodes 21a, and then connect the transparent electrodes 21a included in the X electrode lines 212 with bridging sections 21c in the following steps.

In order to enable applying signals required for touch to X electrode lines 211 and Y electrode lines 212, for example, it is also possible to form X touch driving lines 23 connected with the X electrode lines 211 and Y touch driving lines 24 connected with the Y electrode lines 212. Upon touching, touch driving signals can be input into the X touch driving lines 23 line by line to drive the X electrode lines line by line, and upon scanning and driving each X electrode line, touch reading signals can be input into the Y touch driving lines 24 to read induction signals on the Y electrode lines based, in this way the X and Y coordinates of a touch position can be determined.

Figure 4A:
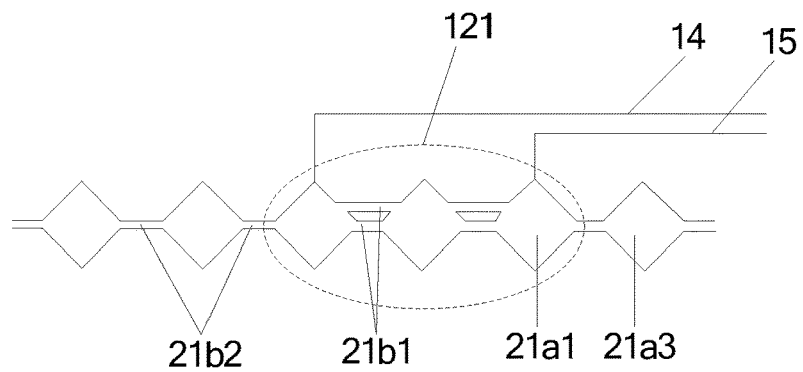
FIG. 4a is a planar structure diagram of a sensing section of the X bending status sensing module in the flexible display device of embodiment II of the present disclosure.
Figure 4B:
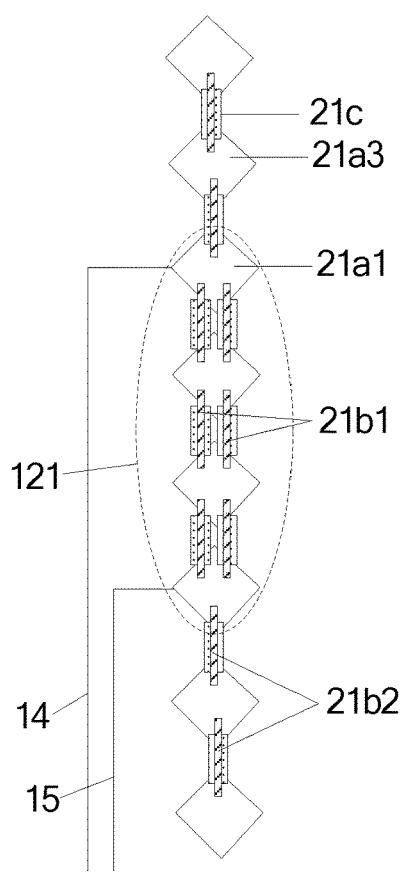
FIG. 4b is a planar structure diagram of a sensing section of the Y bending status sensing module in the flexible display device of embodiment II of the present disclosure.

As shown in FIGS. 4a and 4b, the sensing section includes a first sensing section 121 that shares a portion of an electrode line in a time division manner (in the case as shown in FIG. 4a the portion of the X electrode line 211 is shared by the first sensing section 121 in a time division manner, and in the case as shown in FIG. 4b the portion of the Y electrode line 212 is shared by the first sensing section 121 in a time division manner) and the extension direction of the first sensing section 121 is the same as the direction in which the bending status is to be sensed. For example, if the bending status to be sensed is in the X direction, that is, it is required to sense the bending status of the device in the X direction, it is necessary to arrange the first sensing section 121 to extend in the X direction. The transparent electrode 21a included in the portion of the electrode line that is shared by the first sensing section 121 in the time division manner is referred to as a first bending status sensing electrode 21a1, and the transparent electrodes 21a that are included in the electrode line to which the first sensing section 121 belongs but not shared in the time division manner are referred to as touch electrodes 21a3. The size of the first bending status sensing electrode 21a1 increases while the flexible display device is bent positively, and decreases while the flexible display device negatively. It is to be noted that the sensing section 12 is disposed on the first substrate of the flexible display device, and the "positive bending" as described in the present embodiment refers to bending in the direction away from the side of the first substrate on which the sensing section 12 is located, and "negative bending" refers to bending in the direction towards the side of the first substrate on which the sensing section 12 is located.

Because the first sensing section 121 is attached to the first substrate, when the flexible display device is bent positively in the extension direction of the first sensing section 121 (e.g., the X direction for the case as shown in FIG. 4a), the first bending status sensing electrodes 21a1 of the first sensing section 121 is bent positively along with the device, its shape being stretched and the resistance thereof being increased, and when the flexible display device is bent negatively in the extension direction of the first sensing section 121 (i.e., the X direction), the first bending status sensing electrodes 21a1 is bent negatively with the device, with the shape being compressed and the resistance being reduced. Furthermore, it is possible to learn the bending manner of the device (namely positive bending, no bending, or negative bending) by sensing resistance variation of the first sensing section and to learn the bending degree of the device by sensing the variation amount of the resistance of the first sensing section 121.

For example, further referring to FIG. 1B, the analyzing unit 13 of the bending status sensing module 1 in the present embodiment includes:

a sensing signal analyzing sub-unit 131 configured for analyzing the sense signals generated by the sensing section 12 to obtain the current resistance value of the first sensing section 121 (namely the resistance value of the first sensing section upon the sensing section performing sensing);

a bending manner determining sub-unit 132 connected with the sensing signal analyzing sub-unit 131 and configured for comparing the current resistance value with a reference resistance value (the resistance value of the first sensing section 121 in the condition that the flexible display device is not bent); and determining that the flexible display device is currently in a positive bending status in the extension direction of the first sensing section 121 if the current resistance value is larger than the reference value, which indicates that the first sensing section is stretched; determining that the flexible display device is currently in a non-bending status in the extension direction of the first sensing section 121 if the current resistance value equals the reference resistance value, which indicates that the shape of the first sensing section 121 does not vary; and determining that the flexible display device is currently in a negative bending status in the extension direction of the first sensing section 121 if the current resistance value is smaller than the reference resistance value, which indicates that the first sensing section is compressed; and a bending degree calculating sub-unit 133 connected with the sensing signal analyzing sub-unit 131 and configured for calculating the difference value between the current resistance value and the resistance value, and the difference value characterizes the degree to which the first sensing section 121 is stretched or compressed, and therefore based on the difference value the bending degree of the flexible display device in the extension direction where the first sensing section 121 is bent can be determined.

Sensing of the bending status of the flexible display device is realized by detecting the resistance value variation of the first sensing section 121 of the sensing section 12. Because the first sensing section 121 shares the electrode line 21 of the touch function module 2 in a time division manner, it is not necessary to additionally provide an electrode as the first sensing section 121, and it's only required to input a proper driving signal into the electrode shared in a time division manner in the sensing period. Therefore bending status sensing is realized on the basis of light weight, thin profile, low cost, high reliability, and without increasing complexity of internal circuit structure of the device; and the process of sensing resistance value variation can be performed so straightforward that only one driving signal is needed in driving the sensing section 12.

It is to be noted that after obtaining the bending manner (i.e., positive bending, no bending or negative bending) of the flexible display device and the bending degree of the bending manner, the flexible display device can perform an operation corresponding to the bending manner and the bending degree, such as zooming in a picture or window if it is determined that the flexible display device is positively bent, zooming out the picture or window if it is determined that the flexible display device is negatively bent, and determining the scale of zooming in or out according to the bending degree, thereby realizing input of the bending gesture.

In the present embodiment, the number of first bending status sense electrodes 21a1 shared by the first sensing section 121 in a time division manner may be not too small, otherwise the resistance of the first sensing section 121 is too small, resulting in lower sensing accuracy and higher sensing difficulty; and the number of transparent electrodes shared by the first sensing section 121 in a time division manner may be not too large, otherwise the cross talk may be too high, also resulting in lower sensing accuracy. Based on the above analysis, the first sensing section 121 may, for example, share three to ten first bending status sense electrodes 21a1 in a time division manner, which can result in good balance between resistance and cross talk, a high sensing accuracy and a low sensing difficulty can be obtained.

In order to increase the resistance value of the first sensing section 121, for example, it is possible to adopt the following approach. The electrode line of the present embodiment further includes connection section 21b for each connecting two adjacent transparent electrodes 21a. The connection sections 21a included in the electrode line, to which the first sensing section 121 belongs, may comprise touch connection sections 21b2 and a bending status sensing connection section 21b1; the touch connection sections 21b2 are configured to connect two adjacent touch electrodes 21a3 and connect touch electrodes 21a3 and a first bending status sensing electrodes 21a1 which are adjacent, the bending status sensing connection section 21b1 is configured to connect two adjacent first bending status sensing electrodes 21a1 and shared by the first sensing section 121 in a time division manner, the cross sectional area of the touch connection sections 21b2 in the direction that is perpendicular to the extension direction of the bending status sensing connection section is smaller than the cross sectional area of the bending status sensing connection section 21b1 in the direction that is perpendicular to the extension direction of the first sensing section 121. Because the cross sectional area of the bending status sensing connection section 21b1 is larger than that of the touch connection section 21b2, the resistance of the bending status sensing connection section 21b1 is increased, which in turn increases the resistance value of the first sensing section 121. This configuration allows large resistance to be obtained by sharing a small number of first bending status sensing electrodes 21a1 and is helpful to maintain low cross-talk and high sensing precision.

There are many approaches for realizing that the cross-sectional area of the touch connection section 21b2 is larger than that of the bending status sensing connection section 21b1. For example, it is possible to have the width of the touch connection section 21b2 smaller than that of the bending status sensing connection section 21b1. In another example, as shown in FIG. 4a, it is possible to allow the bending status sensing connection section 21b1 to include two bending status sensing connection sub-sections each connected with two adjacent first bending status sensing electrodes 21a1 and having a width smaller than or equal to that of the touch connection section 21b2.

It is to be noted that, as for the first sensing section 121 that shares the X electrode line 211 as shown in FIG. 4a, it is possible to form the bending status sensing connection section 21b1 and the touch connection section 21b2 along with the transparent electrodes 21a in one patterning step by adding the pattern corresponding to bending status sensing connection section 21b1 on the used mask. Therefore, although the bending status sensing connection section 21b1 has a different pattern from the touch connection section 21b2, they can be formed in same one step without any addition of process steps. For the first sensing section 121 that shares the Y electrode line 212 as shown in FIG. 4b, it is possible to form the bending status sensing connection section 21b1 and the touch connection section 21b2 in one patterning step only by adding the pattern corresponding to bending status sensing connection section 21b1 on the used mask after forming the touch electrode 21a3 and the first bending status sense electrodes 21a1 and forming the insulating layer 21c.

Because when the screen is bent, the largest degree of bending generally occurs in the middle of the screen, in order to improve sensing accuracy and sensitivity, for example, it is possible to allow the midpoint of the first sensing section 121 to coincide with the midpoint of the electrode line 21, to which the first sensing section belongs.

In the present embodiment, the bending status sensing module 1 may further include: an input signal line 14 for connecting the driving unit 11 and the sensing section 12, and an output signal line 15 for connecting the analyzing unit 13 and the sensing section 12. With the input signal line 14, the driving signals generated by the driving unit 11 may be transferred to the sensing section 12; with the output signal line 15, the sensing signals generated by the sensing section 12 may be transferred to the analyzing unit 13. In order to avoid overlapping between the input signal line 14 and the output signal line 15 and other electrodes or lines such that the internal circuit of the device can be simplified and the cross talk is reduced, it is possible to implement the electrode line to which the first sensing section 121 belongs with the outermost electrode line in the touch function module 2.

Embodiment III

In the above-mentioned embodiment II, the bending status is sensed by detecting resistance variation of the first sensing section 121 of the sensing section 12. In the present embodiment, it is also possible to sense the bending status by detecting capacitance variation of the sensing section 12 or by detecting resistance variation and capacitance variation in combination.

Figure 5A:
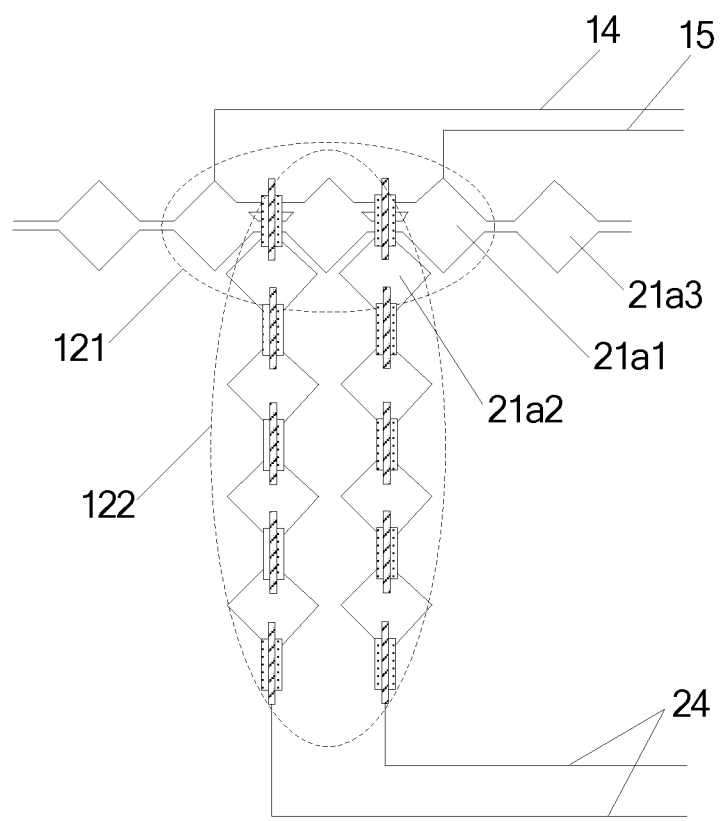
FIG. 5a is a planar structure diagram of a sensing section of the X bending status sensing module in the flexible display device of embodiment III of the present disclosure.
Figure 5B:
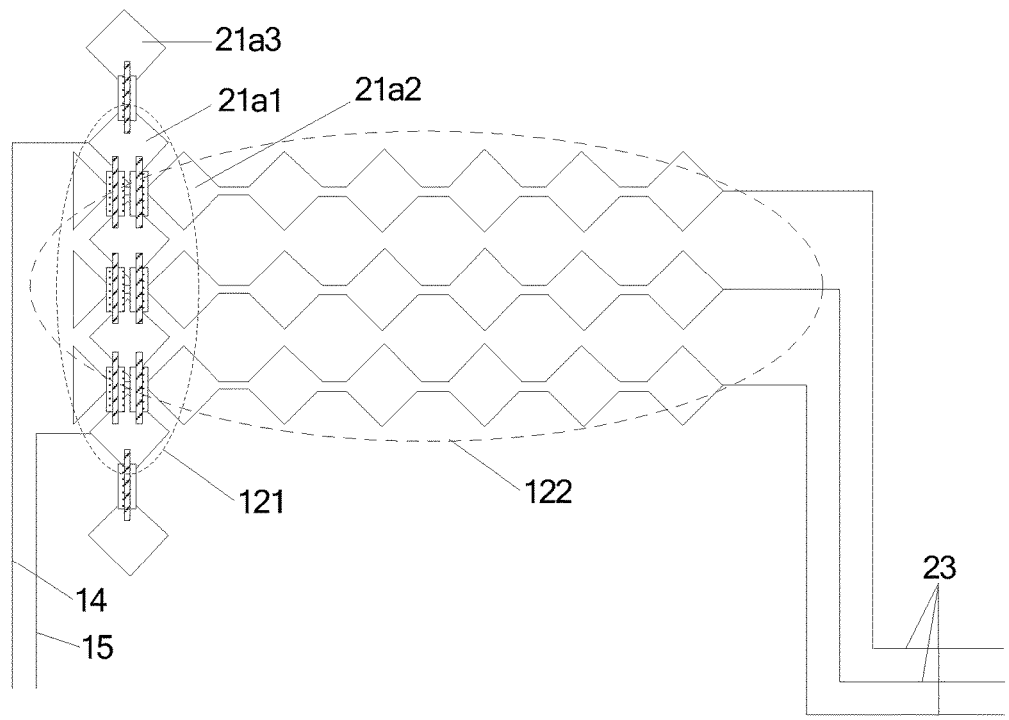
FIG. 5b is a planar structure diagram of a sensing section of the Y bending status sensing module in the flexible display device of embodiment III of the present disclosure.

For example, as shown in FIGS. 5a and 5b, in addition to the aforementioned first sensing section 121, the sensing section 12 further includes a second sensing section 122, and the second sensing section 122 shares a plurality of electrode lines 21 in a time division manner (in the case as shown in FIG. 5a the second sensing section 122 shares Y electrode lines 212 in a time division manner, while in the case as shown in FIG. 5b the sensing section 122 shares X electrode lines 211 in a time division manner). The electrode lines shared by the second sensing section 122 in a time division manner extend in a direction perpendicular to the extension direction of the electrode lines to which the first sensing section 121 belongs, and the first bending status sensing electrodes 21a1 shared by the first sensing section 121 in a time division manner and the electrode lines shared by the second sensing section 122 in a time division manner are arranged alternately in the extension direction of the first sensing section 121 and are each located between two adjacent first bending status sensing electrodes 21a1. The transparent electrodes included in the electrode lines that are shared by the second sensing section 122 in a time division manner are referred to as second bending status sensing electrodes 21a2. The second bending status sensing electrodes 21a2 generate capacitances accordingly with the first bending status sensing electrodes 21a1 on their both sides. The gap between a first bending status sensing electrode 21a1 and a second bending status sensing electrode 21a2 increases when the flexible display device is bent positively while decreases when the flexible display device negatively.

It is to be noted that, in order to form a capacitor between a first bending status sensing electrode 21a1 and a second bending status sensing electrode 21a2, the driving signals generated and output by the driving unit should include a first driving signal and a second driving signal; the first driving signal is transmitted to the first sensing section 121 (for the structure shown in FIGS. 5a and 5b, the first driving signal is transmitted via the input signal line 14), the second driving signal is transmitted to the second sensing section 122 (for the structure shown in FIGS. 5a, the second driving signal is transmitted via the X touch driving line 23), and the first and second driving signals have different potentials such that capacitance is generated between the first bending status sensing electrode 21a1 and the second bending status sensing electrode 21a2.

When the flexible display device is positively bent in the extension direction of the first sensing section 121 (i.e., X direction for the case as shown in FIG. 5a as an example), the gap between the first bending status sensing electrode 21a1 of the first sensing section 121 and the second bending status sensing electrode 21a2 of the second sensing section 122 would be pulled apart along with the positive bending of the device, thereby decreasing the capacitance between them. When the flexible display device is negatively bent in the extension direction of the first sensing section 121 (i.e., X direction), the gap between the first bending status sensing electrode 21a1 and the second bending status sensing electrode 21a2 would be compressed to become smaller along with the negative bending of the device, thereby increasing the capacitance between them. In this way, it is possible to learn the bending manner of the flexible display device (namely positive bending, no bending or negative bending) by sensing the variation of capacitance between the first sensing section 121 and the second sensing section 122 and learn the bending degree of the flexible display device.

Referring to FIG. 1B accordingly, the analyzing unit 13 of the bending status sensing module 1 in the present embodiment includes: a sensing signal analyzing sub-unit 131 configured for analyzing the sense signals generated by the sensing section 12 to obtain the current capacitance value of the sensing section 12.

The analyzing unit 13 further includes a bending manner determination sub-unit 132 connected with the sensing signal analyzing sub-unit 131 and configured for comparing the current capacitance value between the first sensing section 121 and the second sensing section 122 with the reference capacitance value (the capacitance value between the first sensing section 121 and the second sensing section 122 upon the flexible display device being bent). If the current capacitance value is smaller than the reference capacitance value, which indicates that the gap between the first bending status sensing electrode 21a1 of the first sensing section 121 and the second bending status sensing electrode 21a2 of the second sensing section 122 is pulled apart to become larger, it is determined that the flexible display device is currently in a positive bending status in the extension direction of the first sensing section 121. If the current capacitance value is equal to the reference capacitance value, which indicates that the gap between the first bending status sensing electrode 21a1 and the second bending status sensing electrode 21a2 does not change, it is determined that the flexible display device is currently in a no-bending status in the extension direction of the first sensing section 121. If the current capacitance value is larger than the reference capacitance value, which indicates that the gap between the first bending status sensing electrode 21a1 and the second bending status sensing electrode 21a2 is reduced, it is determined that the flexible display device is currently in a negative bending status in the extension direction of the first sensing section 121.

The analyzing unit 13 further includes a bending degree calculating sub-unit 133 connected with the sensing signal analyzing sub-unit 131 and configured for calculating the difference value of the current capacitance value and the reference capacitance value, and based on the difference the bending degree of the flexible display device in the extension direction the first sensing section 121 is bent can be obtained.

Sensing of the bending status of the flexible display device is implemented by detecting the variation of capacitance between the first sensing section 121 and the second sensing section 122. Because the first sensing section 121 and the second sensing section 122 both share the electrode lines 21 of the touch function module 2 in a time division manner, it is not necessary to additionally provide electrodes as the first sensing section 121 and the second sensing section 122 and the operation of sensing is implemented simply by inputting proper driving signals into the electrodes shared in a time division manner in the sensing period. Therefore the sensing of bending status is realized on the basis of light weight, thin profile, low cost, high reliability, and without increasing complexity of internal circuit structure of the device. Furthermore, the approach of sensing capacitance value variation senses the variation of charges directly, resulting in higher sensing sensitivity and precision.

Based on the structure of the sensing section 12 as shown in FIGS. 5a and 5b, in sensing the bending status, it is also possible to learn the bending manner of the device by detecting the resistance value variation of the first sensing section 121 and learn the bending degree of the device by detecting variation of capacitance between the first sensing section 121 and the second sensing section 122.

Referring to FIG. 1B accordingly, the analyzing unit 13 of the bending status sensing module 1 in the present embodiment includes: a sensing signal analyzing sub-unit 131 configured for analyzing the sense signals generated by the sensing section 12 to obtain the current resistance value of the first sensing section 121 and the current capacitance value between the first sensing section 121 and the second sensing section 122.

The analyzing unit 13 further includes a bending manner determination sub-unit 132 connected with the sensing signal analyzing sub-unit 131 and configured for comparing the current resistance value with the reference resistance value (the resistance value of the first sensing section 121 upon the flexible display device being not bent). If the current resistance value is larger than the reference resistance value, it is determined that the flexible display device is currently in a positive bending status in the extension direction of the first sensing section 121. If the current resistance value is equal to the reference resistance value, it is determined that the flexible display device is currently in a no-bending status in the extension direction of the first sensing section 121. If the current resistance value is smaller than the reference resistance value, it is determined that the flexible display device is currently in a negative bending status in the extension direction of the first sensing section.

The analyzing unit 13 further includes a bending degree calculation sub-unit 133 connected with the sensing signal analyzing sub-unit 131 and configured for calculating the difference value between the current capacitance value between the first sensing section 121 and the second sensing section 122 and the reference capacitance value (the capacitance value between the first sensing section 121 and the second sensing section 122 upon the flexible display device being bent), according to which the bending degree of the flexible display device in the extension direction of the first sensing section 121 is obtained.

Because in sensing the bending manner (positive bending, negative bending or no bending) of the display device, it is only required to determine the variation tendency of the practical parameter value (resistance value or capacitance value) with respect to the reference value, this process needs not obtain precise actual parameter value and allows to know the bending manner of the display device by detecting the variation tendency of the resistance value of the first sensing section 121, which makes the process simpler and straightforward since it's only required to input one driving signal into the first sensing section 121. Because in sensing the bending degree of the display device, it's desired to obtain precise actual parameter values that can represent the bending degree, it is possible to know the bending degree of the display device by sensing the variation amount of capacitance between the first sensing section 121 and the second sensing section 122. This approach senses variation of charges directly and has a higher sensitivity.

For the flexible display device in which the sensing section of the bending status sensing module shares the electrode lines of the touch function module in a time division manner, the flexible display device may further include a second substrate disposed oppositely to the first substrate, and the plurality of electrode lines of the touch function module may be located on one side of the first substrate that faces toward or away from the second substrate, namely, forming a in-cell or on-cell touch configuration. The flexible display device may adopt other structures which will not be described in detail herein.

The flexible display device provided in embodiments I to III, for example, may include at least one bending status sensing module for sensing the bending status of the flexible display device in the X direction and one bending status sensing module for sensing the bending status of the flexible display device in the Y direction. The bending status sensing module for sensing the bending status of the flexible display device in the X direction is the X bending status sensing module, and the bending status sensing module for sensing the bending status of the flexible display device in the Y direction is the Y bending status sensing module. The electrode lines to which the first sensing section of the X bending status sensing module belongs are X electrode lines 211, and the electrode lines to which the first sensing section of the Y bending status sensing module belongs are Y electrode lines 212.

Furthermore, it is possible to provide a plurality of X bending status sensing modules (or a plurality of Y bending status sensing modules) in the flexible display device to obtain relatively more accurate sensing results and improve sensing precision ultimately by comparing, selecting, or averaging etc. the sensing results of the plurality of X bending status sensing modules (or the plurality of Y bending status sensing modules).

It is to be noted that the driving unit 11 and the analyzing unit 13 in the bending status sensing module 1 may be preferably integrated on the outer driver circuit of the flexible display device which will not influence the overall thickness and internal structure of the device.

In addition, the flexible display device provided in embodiments of the present disclosure may be of a liquid crystal type, an electronic paper type or an OLED (Organic Light-Emitting Diode) type, and is applicable to any product or component having display function such as a mobile phone, a tablet computer, a TV set, a display, a notebook computer, a digital picture frame or a navigator.

Embodiment IV

The present embodiment provides a driving method for a flexible display device for driving the flexible display devices of embodiments I to III. The driving method includes the following operations:

step S1: generating and outputting driving signals;

step S2: sensing the bending status of the flexible display device under the driving of driving signals and generating a sensing signal; and Step S3: obtaining the bending status information of the flexible display device according to the sensing signal to allow the flexible display device to perform an operation corresponding to the obtained bending status information.

With the above-described steps S1 to S3, sensing of the bending status of the flexible display device is implemented, with the bending status of flexible display device including the bending manner (namely positive bending, no bending or negative bending) and the bending degree of the bending manner, and after obtaining these information, the flexible display device can carry out the operation corresponding to the bending manner and the bending degree, thereby realizing input of a bending gesture.

For example, when the flexible display device further includes a touch function module including a plurality of electrode lines and the sensing section of the bending status sensing module shares at least a portion of one electrode line in a time division manner, the driving method provided in the present embodiment includes: a driving period including a touch period in which the touch position where a user touches the flexible display device is detected and a bending status sensing period in which the bending status information of the flexible display device is obtained by carrying out the above-mentioned steps S1 to S3.

Figure 6A:
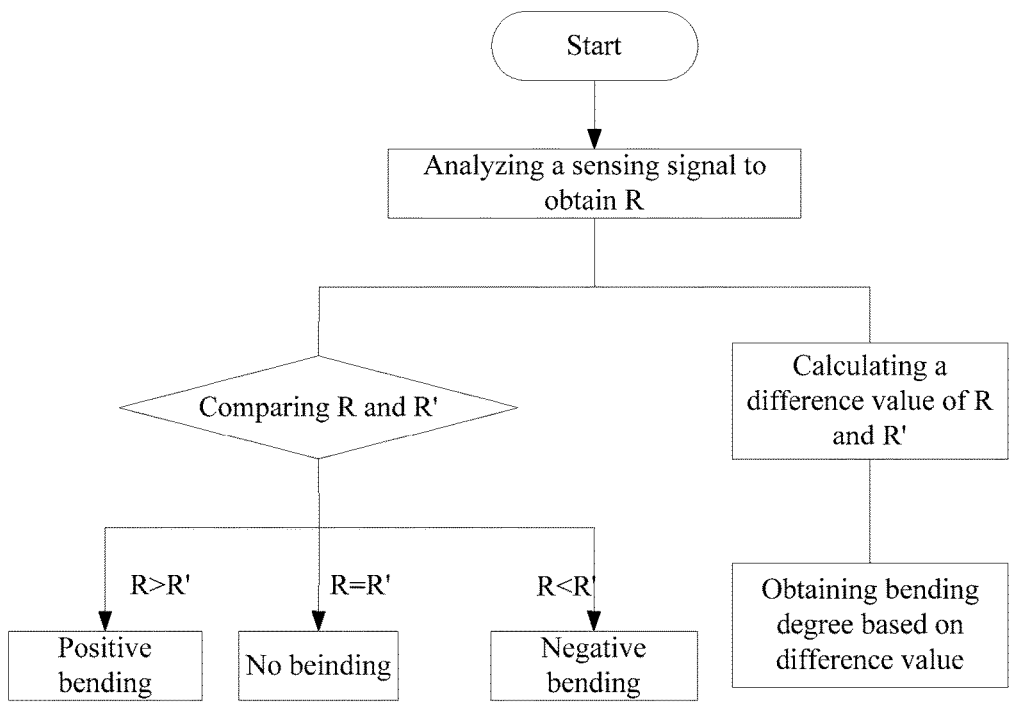
FIG. 6a is a flow chart of the first example of step S3 in the driving method for the flexible display device of embodiment IV of the present disclosure.

In the bending status sensing period, in case that the sensing section 12 of the bending status sensing module includes the first sensing section 121 (the structure as shown in FIGS. 4a and 4b), the aforementioned steps S3 may include the following operations as shown in FIG. 6a:

step S31a: analyzing the sensing signal to derive the current resistance value R of the first sensing section 121 therefrom;

step S32a: comparing the current resistance value R with a reference resistance value R', the reference resistance value R' being the resistance value of the first sensing section 121 while the flexible display device is not bent; and determining that the flexible display device is currently in a positive bending status in the extension direction of the first sensing section 121 if R>R'; determining that the flexible display device is currently in a non-bending status in the extension direction of the first sensing section 121 if R=R'; and determining that the flexible display device is currently in a negative bending status in the extension direction of the first sensing section 121 if R<R';

Step S33a: calculating the difference value between R and R', and obtaining the bending degree of the flexible display device in the extension direction where the first sensing section 121 is bent based on the difference value.

In the above-mentioned steps S31a~S33a, the bending manner and bending degree of the flexible display device is obtained in a way of analyzing the variation of resistance value of the first sensing section 121 of the sensing section, and this way allows to input one driving signal into the first sensing section 121 in driving the sensing section to sense bending status, resulting in a simple driving method.

Figure 6B:
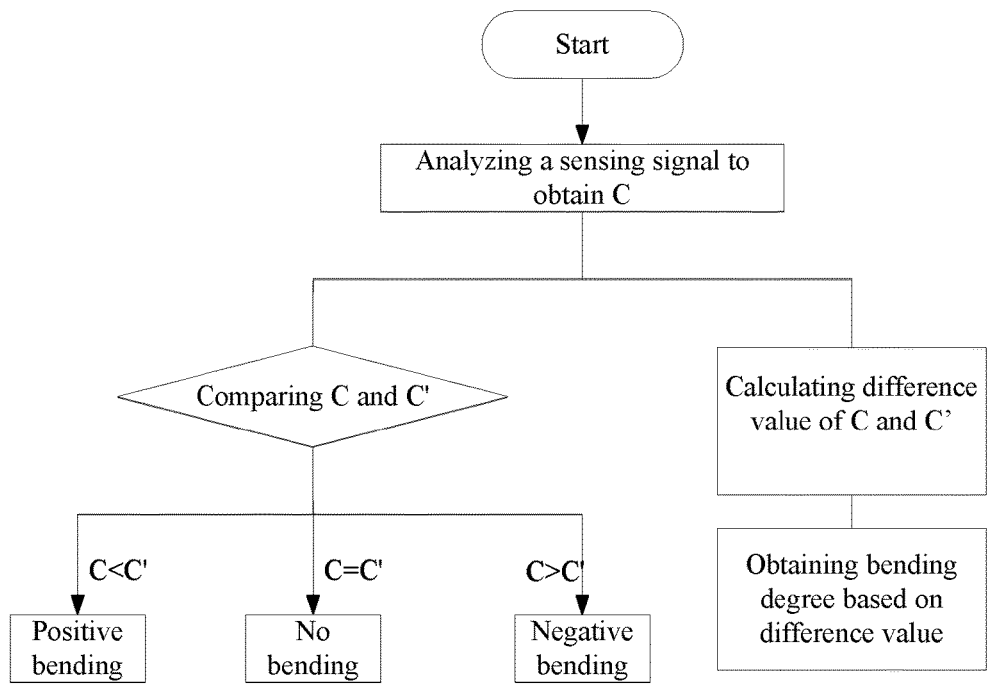
FIG. 6b is a flow chart of the second example of step S3 in the driving method for the flexible display device of embodiment IV of the present disclosure.

In case that the sensing section 12 of the bending status sensing module includes the first sensing section 121 and the second sensing section 122 that form a capacitor correspondingly (the structure as shown in FIGS. 5a and 5b), the aforementioned step S3 may specifically include the following operations as shown in FIG. 6b:

step S31b: analyzing the sensing signal to derive the current capacitance value C between the first sensing section 121 and the second sensing section 122 therefrom;

step S32b: comparing the current capacitance value C with a reference capacitance value C', the reference capacitance value C' being the capacitance value between the first sensing section 121 and the second sensing section 122 while the flexible display device is not bent; and determining that the flexible display device is currently in a positive bending status in the extension direction of the first sensing section 121 if C<C'; determining that the flexible display device is currently in a non-bending status in the extension direction of the first sensing section 121 if C=C'; and determining that the flexible display device is currently in a negative bending status in the extension direction of the first sensing section 121 if C>C';

Step S33b: calculating the difference value between C and C', and obtaining the bending degree of the flexible display device based on the difference value.

In the above-mentioned steps S31b~S33b, the bending manner and bending degree of the flexible display device is obtained in a way of analyzing the variation of capacitance value between the first sensing section 121 and the second sensing section 122 of the sensing section 12, and this way directly senses the quantity of charge variation and has high sensitivity and precision.

Figure 6C:
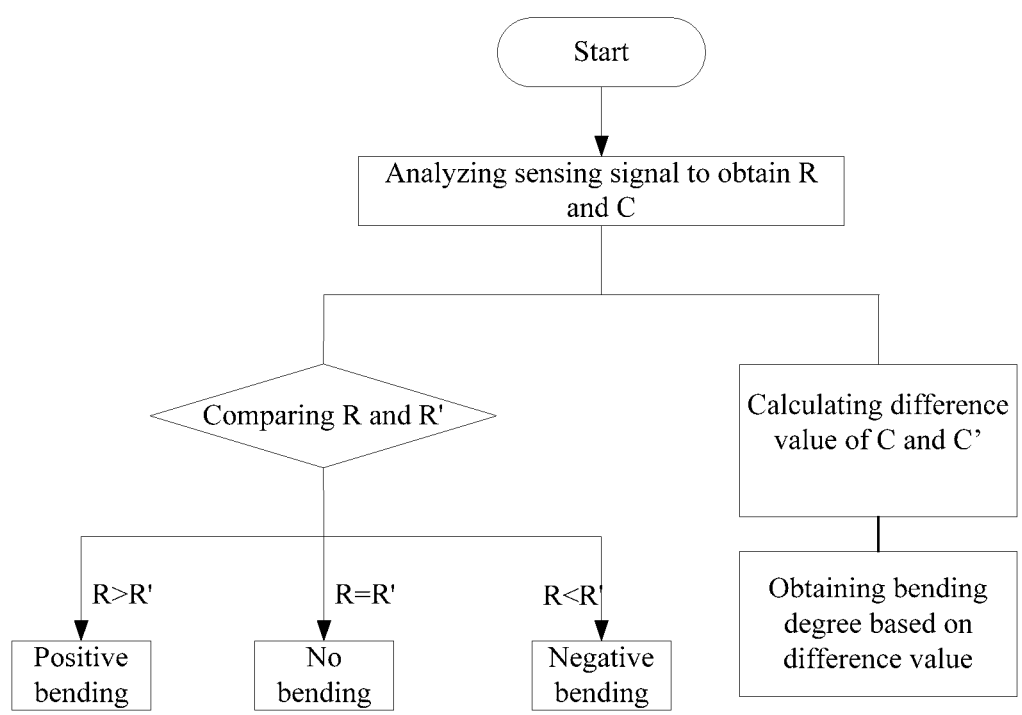
FIG. 6c is a flow chart of the third example of step S3 in the driving method for the flexible display device of embodiment IV of the present disclosure.

In case that the sensing section 12 of the bending status sensing module includes the first sensing section 121 and the second sensing section 122 that form a capacitance accordingly (the structure as shown in FIGS. 5a and 5b), the aforementioned step S3 may also include the following steps as shown in FIG. 6c:

step S31c: analyzing the sensing signal to derive the current resistance value R of the first sensing section 121 and the current capacitance value C between the first sensing section 121 and the second sensing section 122 therefrom;

step S32c: comparing the current resistance value R with a reference resistance value R' that is the resistance value of the first sensing section 121 while the flexible display device is not bent; and determining that the flexible display device is currently in a positive bending status in the extension direction of the first sensing section 121 if R>R'; determining that the flexible display device is currently in a non-bending status in the extension direction of the first sensing section 121 if R=R'; and determining that the flexible display device is currently in a negative bending status in the extension direction of the first sensing section 121 if R<R';

Step S33c: calculating the difference value between C and C', and obtaining the bending degree of the flexible display device based on the difference value.

In the above-mentioned steps S31c~S33c, the bending manner of the flexible display device is obtained in a way of analyzing the variation of resistance value of the first sensing section 121 of the sensing section such that driving is implemented by inputting a driving signal into the first sensing section 121 while driving the sensing section, resulting in a simple driving method; and the bending degree of the flexible display device is obtained in a way of analyzing the variation of capacitance value between the first sensing section 121 and the second sensing section 122 of the sensing section 121, and this way directly senses the quantity of charge variation and has high sensitivity and precision.

It is to be noted that the present embodiment is described only in terms of examples in which the bending status information is obtained according to the sensing signal in each of the above three examples. However, the present disclosure is not limited thereto, in other embodiments of the present disclosure, it is also possible to obtain the bending status information by analysis in other ways, which will not be described herein.

In the flexible display device and the driving method thereof provided in embodiments of the present disclosure, at least one bending status sensing module is provided in the flexible display device, and the bending status sensing module is configured to sense the bending status information of the flexible display device. The bending status sensing module includes: a driving unit, a sensing section, and an analyzing unit; the driving unit is configured for generating and outputting driving signals; the sensing section is connected with the driving unit and disposed on the first substrate of the flexible display device, and sensing section can bend as the flexible display device is bent to generate a sensing signal under the driving of a driving signal; the analyzing unit is configured for obtaining the bending status information of the display device according to the sensing signal such that the display device can perform an operation corresponding to the obtained bending status information, thereby implementing gesture input function of the flexible display device, inputting an instruction to the flexible display device by means of a gesture of bending the flexible display device.

What have been described above are only illustrative implementations of the present disclosure. However, the scope of the present disclosure is not limited thereto, and variations or substitutions that easily occur to one of ordinary skill in the art in the scope disclosed in the present disclosure should be encompassed in the scope of the present disclosure.

The present application claims the priority of the China Patent Application No. 201510179074.0 entitled "Flexible Display Device and Driving Method Thereof" filed on Apr. 15, 2015, which is incorporated herein by reference in its entirety.

What is claimed is:

1. A flexible display device, comprising: a first substrate and at least one bending status sensing module that is configured to sense bending status information of the flexible display device, the bending status sensing module comprising:
   a driving unit configured to generate and output a driving signal;
   a sensing section connected with the driving unit and disposed on the first substrate, the sensing section being configured to be bent as the flexible display device is bent and sense a bending status of the flexible display device under driving of the driving signal and generate a sensing signal;
   an analyzing unit connected with the sensing section and configured to obtain the bending status information of the flexible display device according to the sensing signal to enable the flexible display device to perform an operation corresponding to the obtained bending status information; and
   a touch function module,
   wherein the touch function module comprises a plurality of electrode lines disposed on the first substrate, and the touch function module is configured to sense a touch position of a user touching the flexible display device; and
   the sensing section of the bending status sensing module at least shares a portion of one of the electrode lines in a time division manner, the touch function module senses and obtains the touch position in a touch period included in a driving period, and the bending status sensing module senses and obtains the bending status information in a bending status sensing period included in the driving period.

2. The flexible display device of claim 1,
   wherein the plurality of electrode lines comprise X electrode lines in an X direction and Y electrode lines in a Y direction, and the X direction and the Y direction are perpendicular to each other.

3. The flexible display device of claim 2, wherein the electrode lines included in the touch function module comprise a plurality of transparent electrodes connected in series;
   the sensing section comprises a first sensing section that shares a portion of one electrode line in a time division manner, the first sensing section extends in a direction identical to a direction in which a bending status to be sensed is located, the transparent electrodes included in the portion of the electrode line shared by the first sensing section are first bending status sensing electrodes, the transparent electrodes not included in the portion of the electrode line to which the first sensing section belongs are touch electrodes, a size of the first bending status sensing electrodes increases upon the flexible display device being bent positively and decreases upon the flexible display device being bent negatively; and
   wherein positive bending is bending away from a side of the first substrate on which the sensing section is located, and negative bending is bending towards the side of the first substrate on which the sensing section is located.

4. The flexible display device of claim 3, wherein the analyzing unit comprises:
   a sensing signal analyzing sub-unit configured to analyze the sensing signal to derive a current resistance value of the first sensing section;
   a bending manner determining sub-unit connected with the sensing signal analyzing sub-unit and configured to compare the current resistance value with a reference resistance value, the reference resistance value being a resistance value of the first sensing section upon the flexible display device being not bent, determine that the flexible display device is currently in a positive bending status in an extension direction of the first sensing section if the current resistance value is larger than the reference value, determine that the flexible display device is currently in a non-bending status in the extension direction of the first sensing section if the current resistance value equals the reference resistance value, and determine that the flexible display device is currently in a negative bending status in the extension direction of the first sensing section if the current resistance value is smaller than the reference resistance value; and
   a bending degree calculating sub-unit connected with the sensing signal analyzing sub-unit and configured to calculate a difference value between the current resistance value and the reference resistance value, wherein based on the difference value a bending degree of the flexible display device in the extension direction of the first sensing section is obtained.

5. The flexible display device of claim 3, wherein the electrode line further comprises: connection sections configured to each connect two adjacent transparent electrodes; and
   the connection sections included in the electrode line to which the first sensing section belongs comprise touch connection sections and a bending status sensing connection section, the touch connection section is configured to connect two adjacent touch electrodes and connect touch electrodes and the first bending status sensing electrodes that are adjacent, the bending status sensing connection section is configured to connect two adjacent first bending status sensing connection electrodes, and a cross-sectional area of the touch connection sections perpendicular to the extension direction of the first sensing section is smaller than a cross-sectional area of the bending status sensing connection section perpendicular to the extension direction of the first sensing section.

6. The flexible display device of claim 5, wherein a width of the touch connection sections is smaller than a width of the bending status sensing connection section; or
   the bending status sensing connection section comprises at least two bending status sensing connection sub-sections each connecting two adjacent first bending status sensing electrodes and having a width smaller than or equal to that of the touch connection sections.

7. The flexible display device of claim 3, wherein the first sensing section shares 3 to 10 of the first bending status sensing electrodes in a time division manner.

8. The flexible display device of claim 3, wherein a midpoint of the first sensing section coincides with a midpoint of the electrode line to which the first sensing section belongs.

9. The flexible display device of claim 3, wherein the electrode line to which the first sensing section belongs is an outermost electrode line in the touch function module.

10. The flexible display device of claim 3, wherein the sensing section further comprises: a second sensing section, wherein the second sensing section shares a plurality of electrode lines in a time division manner, the plurality of electrode lines shared by the second sensing section are perpendicular to an extension direction of the first sensing section, and the first bending status sensing electrodes shared by the first sensing section and the electrode lines shared by the second sensing section are arranged alternatively in the extension direction of the first sensing section, transparent electrodes included in the electrode lines shared by the second sensing section are second bending status sensing electrodes, the second bending status sensing electrodes and first bending status sensing electrodes located on both sides thereof generate capacitance accordingly, and a gap between the first bending status sensing electrode and the second bending status sensing electrode increases upon the flexible display device being bent positively and decreases upon the flexible display device being bent negatively.

11. The flexible display device of claim 10, wherein the analyzing unit comprises:
- a sensing signal analyzing sub-unit configured to analyze the sensing signal to derive a current capacitance value between the first sensing section and the second sensing section;
- a bending manner determining sub-unit connected with the sensing signal analyzing sub-unit and configured to compare the current capacitance value with a reference capacitance value, the reference capacitance value being a capacitance value between the first sensing section and the second sensing section upon the flexible display device being not bent, determine that the flexible display device is currently in a positive bending status in the extension direction of the first sensing section if the current capacitance value is smaller than the reference capacitance value, determine that the flexible display device is currently in a non-bending status in the extension direction of the first sensing section if the current capacitance value equals the reference capacitance value, and determine that the flexible display device is currently in a negative bending status in the extension direction of the first sensing section if the current capacitance value is larger than the reference capacitance value; and
- a bending degree calculating sub-unit connected with the sensing signal analyzing sub-unit and configured to calculate a difference value between the current capacitance value and the reference capacitance value, wherein based on the difference value a bending degree of the flexible display device in the extension direction of the first sensing section is obtained.

12. The flexible display device of claim 10, wherein the analyzing unit comprises:
- a sensing signal analyzing sub-unit configured to analyze the sensing signal to derive a current resistance value of the first sensing section and a current capacitance value between the first sensing section and the second sensing section;
- a bending manner determining sub-unit connected with the sensing signal analyzing sub-unit and configured to compare the current resistance value with a reference resistance value, the reference resistance value being a resistance value of the first sensing section upon the flexible display device being not bent, determine that the flexible display device is currently in a positive bending status in the extension direction of the first sensing section if the current resistance value is larger than the reference value, determine that the flexible display device is currently in a non-bending status in the extension direction of the first sensing section if the current resistance value equals the reference resistance value, and determine that the flexible display device is currently in a negative bending status in the extension direction of the first sensing section if the current resistance value is smaller than the reference resistance value; and
- a bending degree calculating sub-unit connected with the sensing signal analyzing sub-unit and configured to calculate a difference value between the current capacitance value and a reference capacitance value, wherein based on difference value a bending degree of the flexible display device in the extension direction of the first sensing section is obtained, the reference capacitance value is a capacitance value between the first sensing section and the second sensing section upon the flexible display device being not bent.

13. The flexible display device of claim 3, wherein the flexible display device comprises at least one bending status sensing module which is configured to sense a bending status of the flexible display device in the X direction and is an X bending status sensing module, and a bending status sensing module which is configured to sense a bending status of the flexible display device in the Y direction and is a Y bending status sensing module, an electrode line to which a first sensing section of the X bending status sensing module belongs is an X electrode line, and an electrode line to which a first sensing section of the Y bending status sensing module belongs is a Y electrode line.

14. The flexible display device of claim 2, further comprising: a second substrate disposed oppositely to the first substrate,
wherein a plurality of electrode lines of the touch function module are located on a side of the first substrate that faces towards or away from the second substrate.

15. The flexible display device of claim 1, wherein the bending status sensing module further comprises:
- an input signal line configured to connect the driving unit and the sensing section; and
- an output signal line configured to connect the analyzing unit and the sensing section.

16. A driving method for a flexible display device for driving the flexible display device of claim 1, the driving method comprising:
- generating and outputting a driving signal;
- sensing a bending status of the flexible display device under driving of the driving signal and generating a sensing signal; and
- obtaining bending status information of the flexible display device according to the sensing signal to enable the flexible display device to perform an operation corresponding to the obtained bending status information wherein the flexible display device further comprises a touch function module comprising a plurality of electrode lines and the sensing section of the flexible display device shares at least a portion of one of the electrode lines in a time division manner, and one driving period comprises a touch period and a bending status sensing period, and the driving method comprises:

sensing a touch position of a user touching the flexible display device in the touch period, and sensing to obtain the bending status information in the bending status sensing period.

17. The driving method of claim 16, wherein the sensing section comprises a first sensing section, and obtaining bending status information of the flexible display device according to the sensing signal comprises:
   analyzing the sensing signal to derive a current resistance value of the first sensing section;
   comparing the current resistance value with a reference resistance value of the first sensing section, the reference resistance value being a resistance value of the first sensing section upon the flexible display device being not bent, determine that the flexible display device is currently in a positive bending status in an extension direction of the first sensing section if the current resistance value of the first sensing section is larger than the reference value, determine that the flexible display device is currently in a non-bending status in the extension direction of the first sensing section if the current resistance value of the first sensing section equals the reference resistance value, and determine that the flexible display device is currently in a negative bending status in the extension direction of the first sensing section if the current resistance value of the first sensing section is smaller than the reference resistance value; and
   calculating a difference value between the current resistance value of the first sensing section and the reference resistance value, wherein based on the difference value a bending degree of the flexible display device in the extension direction of the first sensing section is obtained.

18. The driving method of claim 16, wherein the sensing section comprises a first sensing section and a second sensing section, the second sensing section generates capacitance with the first sensing section correspondingly, and obtaining bending status information of the flexible display device according to the sensing signal comprises:
   analyzing the sensing signal to derive a current capacitance value between the first sensing section and the second sensing section;
   comparing the current capacitance value with a reference capacitance value, the reference capacitance value being a capacitance value between the first sensing section and the second sensing section upon the flexible display device being not bent, determining that the flexible display device is currently in a positive bending status in an extension direction of the first sensing section if the current capacitance value is smaller than the reference capacitance value, determining that the flexible display device is currently in a non-bending status in the extension direction of the first sensing section if the current capacitance value equals the reference capacitance value, and determining that the flexible display device is currently in a negative bending status in the extension direction of the first sensing section if the current capacitance value is larger than the reference capacitance value; and
   calculating a difference value between the current capacitance value and the reference capacitance value, wherein based on the difference value a bending degree of the flexible display device in the extension direction of the first sensing section is obtained.

19. The driving method of claim 16, wherein the sensing section comprises a first sensing section and a second sensing section, the second sensing section generates capacitance with the first sensing section correspondingly, and obtaining bending status information of the flexible display device according to the sensing signal comprises:
   analyzing the sensing signal to derive a current resistance value of the first sensing section and a current capacitance value between the first sensing section and the second sensing section;
   comparing the current resistance value with a reference resistance value, the reference resistance value being a resistance value of the first sensing section upon the flexible display device being not bent, determining that the flexible display device is currently in a positive bending status in an extension direction of the first sensing section if the current resistance value is larger than the reference value, determining that the flexible display device is currently in a non-bending status in the extension direction of the first sensing section if the current resistance value equals the reference resistance value, and determining that the flexible display device is currently in a negative bending status in the extension direction of the first sensing section if the current resistance value is smaller than the reference resistance value; and
   calculating a difference value between the current capacitance value and a reference capacitance value, wherein based on the difference value a bending degree of the flexible display device in the extension direction of the first sensing section is obtained, and the reference capacitance value is a capacitance value between the first sensing section and the second sensing section when the flexible display device being not bent.

* * * * *